May 14, 1946.　　D. D. DONALDSON　　2,400,455
STEREOSCOPIC CAMERA MOUNT
Filed March 31, 1944　　2 Sheets-Sheet 1

D. D. Donaldson
INVENTOR.

BY Edwin C. McRae
R. G. Harris.
Attorneys

May 14, 1946.　　D. D. DONALDSON　　2,400,455
STEREOSCOPIC CAMERA MOUNT
Filed March 31, 1944　　2 Sheets-Sheet 2
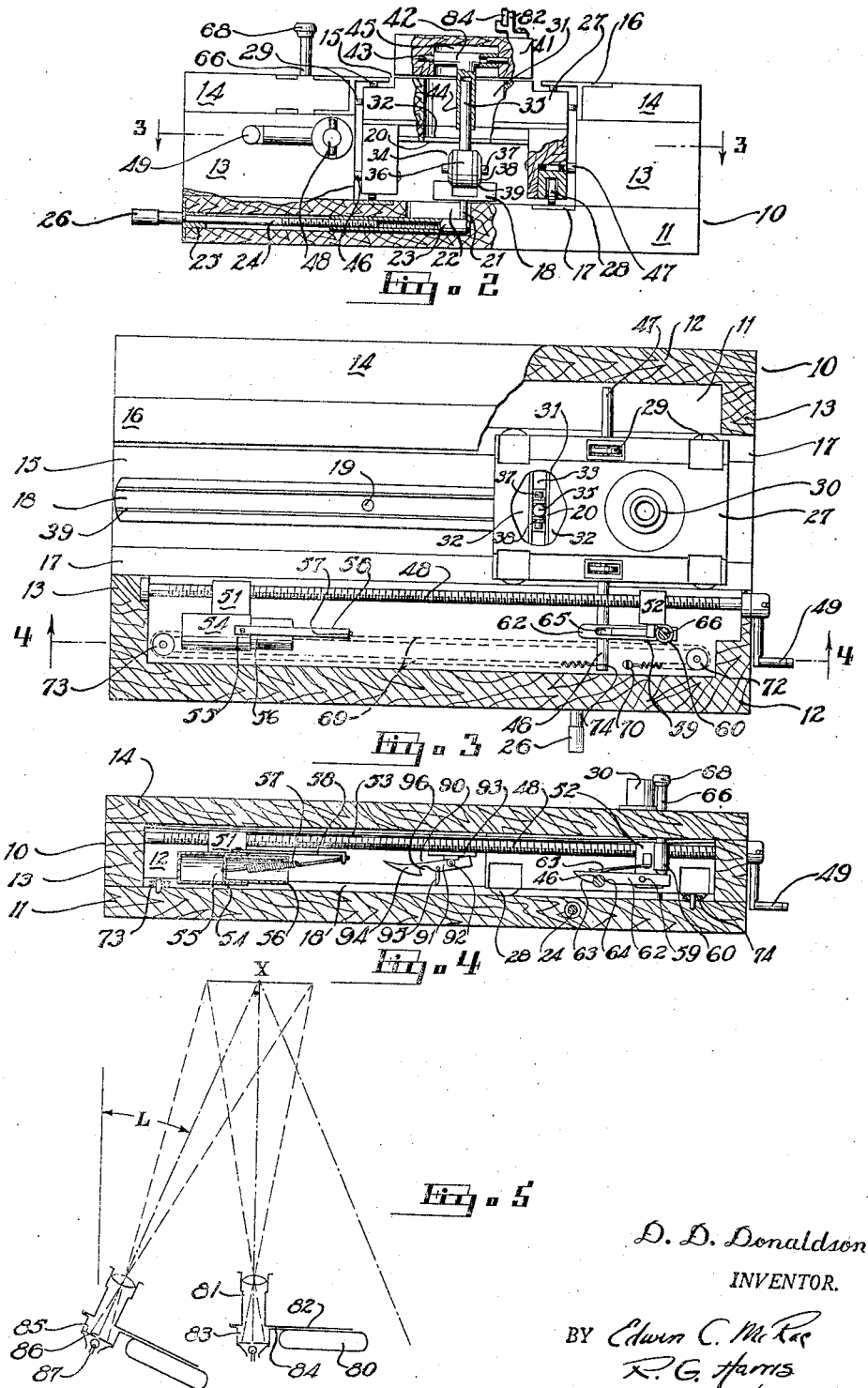
D. D. Donaldson
INVENTOR.
BY Edwin C. McRae
R. G. Harris
Attorneys.

Patented May 14, 1946

2,400,455

UNITED STATES PATENT OFFICE 2,400,455

STEREOSCOPIC CAMERA MOUNT

David D. Donaldson, Dearborn, Mich.

Application March 31, 1944, Serial No. 529,006

14 Claims. (Cl. 95—86)

This invention relates to photographic equipment; and, more particularly, to a movable camera mount for use in taking stereoscopic photographs with a conventional single lens camera.

The use of single or double lens cameras in taking stereoscopic photographs is well-known in the art. With the latter the interlens distance is, of course, fixed at the interocular distance of about 65 mm. In the case of the former, the camera must be mounted so it may be traversed at least through the interocular distance, and successive exposures made in each position to obtain the stereoscopic effect. Such mountings for single lens cameras have included a simple tray device having stops at each end or a slot in which a projection from the camera slides to permit translation through the desired distance, an offset support rotatably mounted on a vertical pivot, and various linkage by means of which the camera may be moved through a predetermined horizontal distance to obtain the necessary separation between successive exposures. This application discloses a device which finds its greatest application in obtaining colored transparencies in clinical photography in which the distance to the principal plane is measured by a matter of inches and the depths of the objects are comparably small, so that the ability to provide different lens separations than the conventional 65 mm. is of considerable value. This, of course, is one of the prime advantages of the single lens system. As a practical matter, it is particularly desirable that the mounting means be automatic and immediate in operation since the object is not always immobilized and may not be under physical control. Due to the short distances involved, and the nature of the photographs desired, exact focus and field must be easily determined and maintained for both exposures, or even for a series of such dual exposures. Finally, the photography of small objects at short distances requires a partial revolution of the camera about the object rather than a linear translation to prevent undue displacement of the images.

The present invention, therefore, involves first of all a stereoscopic mount for a single lens camera in which the camera is instantaneously and automatically shifted from one position to the other. The mounting is further characterized in permitting a wide adjustment of the lens separation distance which is readily changed to fit particular circumstances depending upon the displacement of the principal planes and the depth of the object to be photographed; and in which both the distance and the angle of the camera are automatically correlated. Still another function of the device is the improved focusing system by means of which both the field of view and the focus of the principal object in the field are readily obtained and maintained exactly for each exposure. Another advantage is that the device is automatic in operation and when once set up, any number of stereoscopic pairs may be taken with only routine checking, and none of the difficulties usually inherent in single lens stereoscopic photography are encountered. In short the present device includes in one highly compact apparatus an adjustable stereoscopic mounting for a single lens camera combined with a novel focusing device, both of which are automatic in operation and with which stereoscopic photographs may be taken with a maximum of speed and accuracy and a minimum of difficulty.

With these and other objects in view, the invention consists in the arrangement, construction and combination of the various parts of the improved device as described in the specification, claimed in the claims, and illustrated in the accompanying drawings, in which:

Figure 2 is an end view of the mount, portions thereof being broken away to show the interior mechanism.

Figure 3 is a plan view of the mount, portions thereof being broken away substantially on the line 3—3 of Figure 2.

Figure 4 is a sectional elevation taken on the line 4—4 of Figure 3.

Figure 5 is a schematic representation of the method followed in establishing the field of view and focusing the camera preliminary to taking a series of stereoscopic photographs.

Figure 1:
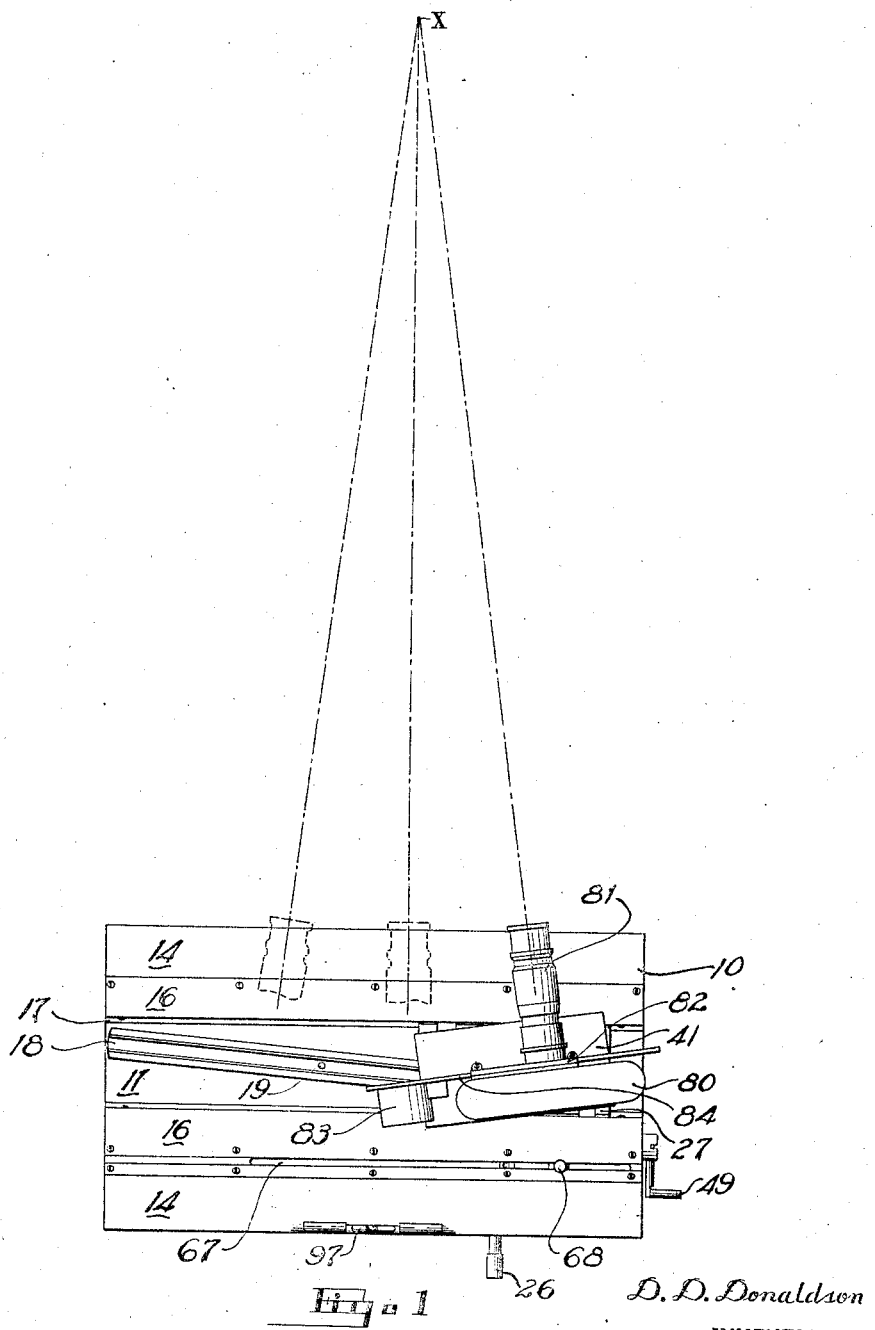
Figure 1 is a plan view of the mount showing the camera in place and indicating the successive positions occupied by the camera.

Referring first to Figures 2, 3 and 4, the mount 10 is essentially in the form of a covered box having a base 11, sides 12 and ends 13. The ends 13 and the top 14 are cut away to form an opening 15 extending longitudinally from one end of the mount 10 to the other. The top 14 is reinforced along this opening by T- or channel-shaped metallic bearing strips 16 and flat strips are let into the base 11 of the mount at the sides of the opening 15 to form a rail 17. A channel-section track 18 lies on the base 11, generally longitudinally of the mount and is pivoted to it at 19—the relative location of this pivot being determined by considerations which will be explained later. Adjacent the one end of the track 18, a pin 21 extends downwardly into a recess 22 formed in the base 11 and engages the end of an internally tapped sleeve 23, which receives the threaded rod 24 extending through a thrust bushing 25 to the track control knob 26. Rotation of the knob 26 varies the combined length of sleeve 23 and rod 24 and changes the obliquity of the track 18 about the pivot 19 with respect to the mount, as best seen in Figure 1.

A carriage 27 is received in the opening 15 and is supported for longitudinal reciprocation by rollers 28 engaging the rail 17 and other rollers 29 engaging the side and bottom of the bearing strip 16, as best seen in Figure 2. The carriage 27 is substantially in the form of an inverted channel in transverse section and includes a ball bearing swivel mount 30 and a diamond-shaped hole 31, at the bottom of which are a pair of plates 32 with beveled edges 20 defining a transverse slot 33. A track follower 34 has an upwardly extending shank 35 extending through the transverse slot 33 and an enlarged circular head 36 supporting a transverse axle 37 on which are mounted coned rollers 38 adapted to run in the track 18, which is correspondingly beveled at 39 to receive them. A camera holding block 41 (shown only in Figures 1 and 2) slips over the swivel mount 30 and is pivotally supported on it for free rotation. It has a recess 42 generally conforming to the diamond-shaped hole 31 in the carriage 27 and in it a sleeve 44 having a T-shaped head 45 is rotatably secured by transverse pins 43. The sleeve 44 slips over upwardly extending shank 35 of the track follower 34 and is effective as the track follower 34 proceeds along the track 18 to bias the camera-holding block 41 about the swivel mount 30, so that for any position along the track in any of its various positions of obliquity, the camera-holding block 41 will assume a definite position of angularity with respect to the longitudinal center line of the mount. Furthermore, the degree of obliquity will be equal and opposite at all points spaced equally on each side of the transverse centerline of the mount. One such extreme position of the block is shown in Figure 1, but there are numerous others depending upon the obliquity of the track 18 and the displacement of the carriage 27 from the transverse centerline of the mount. The carriage is further provided with a rod 46 extending outwardly from one side and serving (as explained below) to control the interlens distance and a similar rod 47 on the opposite side, which is utilized to hold the carriage in central position for focusing.

The adjustment of the interlens distance and the automatic traversing of the camera from one selected position to another is effected by the mechanism best shown in Figures 3 and 4. This comprises a threaded shaft 48 rotatably mounted in the ends 13 of the mount 10 and having an external crank 49. The opposite halves of the shaft 48 are threaded in opposite sense, and two appropriately threaded carrier blocks 51 and 52 are mounted on it and restrained from relative rotation by having their flat upper surfaces bearing against a thin metal leaf spring 53 extending the length of the mount and normally flexing down slightly from the underside of the top 14. When the crank 49 is rotated, the carrier blocks 51 and 52 will then move inwardly or outwardly along the threaded shaft 48, depending upon the sense of rotation.

The left-hand carrier block 51 carries a dash pot 54 comprising an outer cylinder 55 and a piston 56, which is attached through a coil spring 57 to a bar 58 fixed to the block 51. The right-hand carrier block 52 carries a laterally extending pivot pin 59 and a vertical sleeve 60. A detent arm 62 is pivoted on the pin 59 and has a cam surface leading portion 63 terminating in a notch 64. A leaf spring 65 resiliently urges the arm 62 in a counterclockwise direction. Movement of the arm in this direction beyond a certain point is restricted by the trip rod 66, which is carried in the vertical sleeve 60 and extends upwardly through a slot 67 in the top 14 of the mount (see Figure 1) and terminates in a button 68. Down pressure on the knob 68 will cause the arm 62 to pivot in a clockwise direction about the pin 59 against the urging of the spring 65 and free the notch 64 from the rod 46.

The carriage 27 is normally urged toward the left by a long coil spring 69, which is secured to the base 11 of the mount at the screw 70 and extends to the right to the pulley 72, thence lengthwise to the left to the pulley 73 and again lengthwise to the right and is fastened to the end of the rod 46 as indicated at 74. Figure 4 shows the carriage 27 in the right-hand position with the detent arm 62 locked on the rod 46 and holding the carriage against the resilient action of the coil spring 69. When the knob 68 is depressed, the rod 46 is released from the detent notch 64 and the urging of the spring 69 propels the carriage rapidly to the left until the rod 46 strikes the outer end of the piston 56 of the dash pot 54. The action of the dash pot in connection with the restraining spring 57 cushions the carriage to a stop. Thus, a camera mounted on the carriage when at the right—as shown in Figure 4—is in position to take one exposure. After the knob is depressed, the carriage immediately slides to the left into a position equally spaced on the opposite side of the center of the mount and is brought to rest, so that another exposure may be taken to complete the stereoscopic pair. At the same time, the track follower 34 operating as explained above, changes the obliquity of the holding block 41 depending upon the angularity of the track 18, so that when the camera is set and focused in one position and an exposure made, it may be immediately traversed through a selected interlens distance to a second position at proper angularity for the making of the companion exposure; and the interlens distance may be varied without changing focus or angle of obliquity.

Reference is now made to Figures 1, 2 and 5 to show the method of setting up the camera. In the present instance a 35-mm. precision camera of conventional "Leica" or "Contax" type is used, with a separate sliding lens board as an accessory. The camera is indicated in outline at 80 and the lens at 81. The lens is fixedly secured to the board 82, which, in turn, is fixed to the camera-holding block 41. The camera 80 and a focusing chamber 83 are, in turn, fixed to a sliding board 84 slidably mounted on the fixed board 82. This is a standard camera accessory and it is not believed that an extensive description of it is necessary for those who are acquainted with this art. In Figure 1, the camera 80 is shown in position behind the lens; however, the sliding board 84 may be projected toward the right until the focusing chamber 83 is aligned with the lens to assist in focusing on the object, as indicated in Figure 5.

It will be noted that the chamber 83 includes a focusing diaphragm 85 having a slit 86 and a projecting lamp 87 by means of which an image of the slit can be projected through the lens 81 of the camera on a selected point of the object X to be photographed to determine the focus and alignment. When this is established, the sliding board 84 can then be pushed to the left until the camera aligns with the lens, and the focus and alignment of the camera is then established as indicated by the focusing chamber.

In the work under consideration, precise focus and field coverage are of paramount importance. The objects to be photographed are very small and clarity and separation between the various planes is essential if the photographs obtained are to serve their purpose as a clinical record. At the same time, because of the short distances involved, the field view is small and it is necessary to center as accurately as possible the exact area of which a photograph is desired. It is in this particular that the present camera mounting excels. Obviously, in making the two stereoscopic exposures, the camera will be at two separate positions and, normally, it would be necessary to refocus and realign the camera in each. The present mount, however, affords a method of accurate and ready focus and alignment of particular utility. This comprises, first, a means to center the camera initially at a point precisely midway of the two positions from which the stereoscopic views will be taken. To accomplish this, reference is again made to Figures 3 and 4. It was noted above that a rod 47 extended laterally from the carriage 27. A centering detent generally shown at 90 is located within the mount 10 on the side opposite to that occupied by the traversing mechanism already described. This centering detent 90 includes a detent arm 91 pivoted at 92 to a block 93 secured to the underside of the top 14. The arm 93 normally assumes the position shown in Figure 4, its further motion counterclockwise being prevented by the interference of the right-hand end of the arm with the block 93, but being free to move in a clockwise direction. The arm 91 includes a cam-shaped leading face 94 and a freely pivoted switch bar 95 which, revolved in a clockwise direction, will close the detent notch 96 but normally assume the position shown in Figure 4.

As explained above, Figure 4 shows the carriage in its extreme right-hand position and held against the urging of the spring 69 by the detent arm 62. When this is released by pushing down on the knob 68, the carriage 27 slides toward the left. As it follows its course, the rod 47 pushes the switch bar 95 upwardly closing off the detent notch 96 and the carriage slides past the centering detent 90 and continues until it is brought to a halt by the dash pot 54. However, when it is desired to engage the carriage in the central position, it is moved slowly from the extreme left-hand position towards the right until the rod 47 reaches an approximate midpoint when it engages the cam-shaped leading face 94 of the detent arm 91 and lifts it upwardly. If the movement of the carriage is then sufficiently slow, the detent arm 91 will move downwardly as soon as the rod 47 comes abreast of the detent notch 96. This will result in a slight "click" and if the pressure is then removed from the carriage, the spring 69 will again urge the carriage 27 toward the left but it will be locked in central position by the rod 47 engaging in the notch 96. However, if the movement to the right is continued uninterruptedly, as when it is desired to reset the camera in the extreme position shown in Figure 4, the rod 47 will merely slide over notch 96 and push back the switch bar 95 without being impeded. Therefore, the centering detent will not affect the rapid movement of the carriage 27 either to the left or to the right, but if the carriage is moved slowly to the right and stopped and released when the "click" is heard, it will be locked precisely in a central position.

In operation, the first step would be to set the mount up on a tripod or other support in the desired position and leveling it longitudinally by reference to the spirit level 97. The carriage 27 is then locked in the mid-position, as explained in the preceding paragraph, and the focusing chamber is engaged behind the lens, as shown in Figure 5. The image of the slit is projected upon the object to be photographed and is brought to focus by suitable adjustment of the lens and the desired alignment obtained by manipulation of the mount. The interlens distance is then set by operation of the cranks 49, which set the carrier blocks 51 and 52 at the desired latitude. This distance is determined largely by experience with due respect to the separation desired between the planes and the object to be photographed. The camera carriage is moved to one of the extreme positions governed by the blocks, usually to the right, although it may be done to the left, as is shown in Figure 5, and the track control knob 26 is operated by changing the angularity of the track 18 until the projected image of the slit 86 is brought to the same position and focus it occupied on the subject as when the camera was in the central position. It will now be apparent that the camera is set in focus and the alignment for either of the extreme positions at which exposures are to be made to get the desired stereoscopic effects. Assuming the camera to be at the extreme right, as the sliding board 84 having been moved to the left, the focusing chamber disengaged from the lens and the camera engaged with it, as in Figure 1, the camera shutter may be operated to take the first picture. The knob 68 is then depressed and the carriage slides immediately to the left to be brought to a gradual stop at a predetermined position, an equal distance on the other side of the center of the mount, and the shutter operated to take a second picture. It is contemplated that a conventional automatic film winding device may be used with the camera, so that the exposed film will be replaced and the shutter reset immediately after the first picture is taken and the camera will be ready for operation in the second position as soon as it reaches there. However, if desired, a hand winding may be used and it should not delay operation particularly, since nothing else is required in the way of focusing or alignment. The camera may then again be moved to the right where it is ready for another sequence when that is desired. It will not be necessary to reset the focus or alignment so long as the same object is photographed, but when a different field of view is desired, it may be readily aligned and focused as explained above and the two exposures made without difficulty. It will be noted that the pivot 19 is spaced to the left of the transverse center of the mount, a distance sufficient so that when the shank 35 is over it, the pivot mount 38 is at the center position. Thus, for any obliquity of the track 18, the camera is always parallel to the mount, as it reaches the mid-point of its travel.

The principal advantage of the present device is that it gives a wide control over the interlens distance and correlates the obliquity of the camera, a most important point when taking photographs of small objects at short distances. This gives a very precise selection of the separation of the various picture planes and it is possible by varying the distance and obliquity to emphasize such pertinent features as may be necessary, an advantage which will be recognized in the field of clinical photography. Another noteworthy fact is that the time interval between two exposures is cut practically to zero. This interval has always been a very definite limiting factor in the use of a single lens stereographic camera. Employing—as suggested above—an automatic winding device, the two exposures may be taken within a matter of seconds of each other since the traversing, focusing and alignment of the camera is entirely automatic and as soon as the first picture is taken, the camera is transported to the second position where, the film already having been rewound, the second picture may be taken. This can be done with precision and accuracy in about the time that a skilled photographer can operate the camera shutter release twice. The device is extremely compact and dependable in action. It is particularly valuable for taking colored transparencies, since all views are on one film and differences in processing, which can occur when separate films are used as in dual cameras, will not affect the stereoscopic qualities of the photographs. While shown as utilizing a frame of wood construction, it is, of course, readily made of metal or any other of the usual structural materials with a further reduction in weight and bulkiness. However, the scale of the device can be judged by comparing it to the outline of the "Leica" type camera shown in Figure 1.

Some changes may be made in the arrangement of the parts disclosed and the apparatus described without departing from the spirit of the invention. It is the intention to cover by the claims such changes as may reasonably be included within the scope thereof.

The invention claimed is:

1. In a device for supporting a single camera for taking stereoscopic photographs, a supporting means, a carriage to receive said camera reciprocally mounted on said supporting means, resilient means urging said carriage to one position of reciprocation, detent means releasably securing said camera in the opposite position of reciprocation against the urging of said resilient means, and means to adjust concurrently said one position of reciprocation and said opposite position of reciprocation including that of said detent to vary the extent of travel therebetween.

2. In a device for supporting a camera for taking stereoscopic photographs, a supporting means, a carriage to receive said camera reciprocally mounted on said supporting means, means urging said carriage to one position of reciprocation, detent means releasably securing said camera in the opposite position of reciprocation, means to concurrently vary said one position of reciprocation and said opposite position of reciprocation to change the extent of travel of the carriage therebetween, and means automatically operable on reciprocation of said carriage to vary proportionately and oppositely the angularity of said carriage with respect to said supporting means at said one position of reciprocation and said opposite position of reciprocation.

3. In a device for supporting a camera for taking stereoscopic photographs, a supporting means, a carriage to receive said camera reciprocally mounted on said supporting means, resilient means urging said carriage to one position of reciprocation, detent means releasably securing said camera in the opposite position of reciprocation against the urging of said resilient means, means to vary equally and in the opposite sense said one position of reciprocation and said opposite position of reciprocation to control the reciprocal travel of said carriage, selectively settable means automatically effective on reciprocation of said carriage to vary proportionally the opposite and equal angularity of said carriage with respect to said mount at said one position of reciprocation and said opposite of reciprocation.

4. In a device for supporting a camera for taking stereoscopic photographs, a supporting means, a carriage to receive said camera reciprocally mounted on said supporting means, resilient means urging said carriage to one position of reciprocation, detent means releasably securing said camera in the opposite position of reciprocation against the urging of said resilient means, selectively operable detent means to secure said carriage midway between said positions of reciprocation, and means to vary concurrently and equally the distances of said positions of reciprocation on each side of said midway position.

5. In a device for supporting a camera for taking stereoscopic photographs, a supporting means, a carriage to receive said camera reciprocally mounted on said supporting means, resilient means urging said carriage to one position of reciprocation, detent means releasably securing said carriage in the opposite position of reciprocation against the urging of said resilient means, selectively operable detent means effective to secure said carriage at a position midway of said positions of reciprocation, and means to vary the angularity of said carriage equally and oppositely with respect to said supporting means at said positions of reciprocation.

6. In a device for supporting a camera for taking stereoscopic photographs, a supporting means, a carriage to receive said camera reciprocally mounted on said supporting means, resilient means urging said carriage to one position of reciprocation, detent means releasably securing said camera in the opposite position of reciprocation against the urging of said resilient means, means selectively operable to secure said carriage in a central position between said positions of reciprocation or to permit free travel therebetween, means to vary concurrently and equally said positions of reciprocation with respect to said central position, and means automatically operable on reciprocation of said carriage to change the angularity of said carriage with respect to said supporting means equally and oppositely at said positions of reciprocation, and adjusting means effective with said automatically operable means to vary the angularity of said carriage at said positions of reciprocation.

7. The structure of claim 5, which is further characterized in that said second detent means comprises means rendering it inoperative to engage said carriage moving in response to said resilient means and selectively operable to engage said carriage when said carriage is moved against the urging of said resilient means.

8. In a device for supporting a camera for taking stereoscopic photographs, a supporting means, a carriage reciprocally mounted on said supporting means, a camera support to receive said camera on said carriage, a rod running lengthwise of said supporting means and having oppositely threaded portions, blocks threadedly engaging said portions and adapted on rotation of said rod to concurrently approach or be displaced from the longitudinal, center of said supporting means, a stop on one said block, a selectively operable detent on the other said block, resilient means normally urging said carriage toward the end of said supporting means adjacent said stop, and means on said carriage adapted to engage said detent when said carriage is displaced against the urging of said resilient means on said supporting means.

9. In a device for supporting a camera for taking stereoscopic photographs, a supporting means, a carriage reciprocally mounted on said supporting means for transportation between two extreme positions of reciprocation, a camera mount pivotally secured to said carriage, a track extending substantially lengthwise of said supporting means adjacent said carriage and pivoted to said supporting means at a point intermediate its ends, selectively operable means to rotate said track about said pivot, and a track follower means transported by said carriage and engaging said camera mount, said follower means effective through following said track on reciprocation of said carriage to vary the angularity of said camera mount equally and oppositely with respect to said support at said positions of reciprocation.

10. The structure of claim 9, which is further characterized in that said following means comprises a cam engaging said track and having a member extending therefrom through a transverse slot in said carriage, a second member mounted on transverse pivots in said camera mount substantially above said slot when said camera mount and said carriage are longitudinally aligned, said first member and said second member being interengaged for relative longitudinal movement.

11. In a device for supporting a camera for taking stereoscopic photographs, a supporting means, a carriage reciprocally mounted on said supporting means, resilient means urging said carriage to one position of reciprocation, detent means releasably securing said carriage in the opposite position of reciprocation, a camera mount pivoted on said carriage, a track pivoted on said supporting means adjacent said carriage, a track follower carried by said carriage and engaging said camera mount and said track and effective on reciprocation of said carriage to vary the angularity of said pivoted camera mount with respect to said carriage, and adjusting means in said support engaging said track and operable to cause limited rotation of said track about its pivot on said supporting means.

12. In a device for supporting a camera for taking stereoscopic photographs, a supporting means, a carriage reciprocally mounted on said supporting means, resilient means urging said carriage to one position of reciprocation, detent means releasably securing said carriage in the opposite position of reciprocation, a camera mount pivoted on said carriage, a track pivoted on said supporting means adjacent said carriage, a track follower carried by said carriage and engaging said camera mount and said track and effective on reciprocation of said carriage to vary the angularity of said pivoted camera mount with respect to said carriage, and a second detent on said supporting means effective to secure said camera support substantially midway of said positions of reciprocation, said detent being ineffective when said carriage is moving in response to the urging of said resilient means and selectively operable when said carriage is moved against the urging of said resilient means.

13. In a device for supporting a camera for taking stereoscopic photographs, a supporting means, a carriage reciprocally mounted on said supporting means, resilient means urging said carriage to one position of reciprocation, detent means releasably securing said carriage in the opposite position of reciprocation, a camera mount pivoted on said carriage, a track pivoted on said supporting means adjacent said carriage, a track follower carried by said carriage and engaging said camera mount and effective on reciprocation of said carriage to vary the angularity of said camera mount with respect to said carriage, a threaded rod rotatably supported longitudinally of said supporting means, said rod having oppositely threaded sections, blocks on said sections operable concurrently inwardly or outwardly on the rotation of said rod, said detent being carried by one said block, a stop carried by the other said block, a second detent on said supporting means positioned to engage said carriage midway between said first detent and said stop, said second detent being inoperable when said carriage is moving in response to the urging of said resilient means and selectively operable when said carriage is moved against the urging of said resilient means.

14. In a device for supporting a camera for taking stereoscopic photographs, a supporting means, a carriage reciprocally mounted on said supporting means, resilient means urging said carriage to one position of reciprocation, detent means releasably securing said carriage in the opposite position of reciprocation, a camera mount movably secured on said carriage, a track pivoted on said supporting means adjacent said carriage, a track follower carried by said carriage and engaging said camera mount and said track and effective on reciprocation of said carriage to vary the angularity of said movable camera mount with respect to said carriage, adjustable means on said support to vary selectively the position of said track about its pivot on said supporting means, a rod having two oppositely threaded portions rotatably mounted in said supporting means and extending along the line of reciprocal travel of said carriage, a block mounted on each of said oppositely threaded sections of said rod and effective on rotation of said rod to move concurrently toward or away from each other, a member projecting from said carriage, said detent means being mounted on said block, a stop means defining said one position of reciprocation being mounted on the other said block, said stop means including a dash pot, a second detent secured to said supporting means and adapted to secure said camera support at a point substantially midway between said positions of reciprocation, said second detent being inoperable when said carriage is moving in response to the urging of said resilient means and selectively operable when said carriage is moved counter to the urging of said resilient means, the angularity of said movable camera support with respect to said carriage varying equally and oppositely at said positions of reciprocation from that obtaining when said carriage is engaged by said second detent.

DAVID D. DONALDSON.